United States Patent [19]

Walberg

[11] 4,077,354
[45] Mar. 7, 1978

[54] FAST DISCHARGE ELECTROSTATIC COATING SYSTEM

[76] Inventor: Arvid C. Walberg, 708 S. Lombard Ave., Lombard, Ill. 60148

[21] Appl. No.: 730,308

[22] Filed: Oct. 7, 1976

[51] Int. Cl.² ............................................. B05C 11/00
[52] U.S. Cl. ....................................... 118/12; 118/629
[58] Field of Search .................... 118/11, 12, 627, 629; 239/3, 15; 317/3, 9 R

[56] References Cited

U.S. PATENT DOCUMENTS

| | | | |
|---|---|---|---|
| 3,273,015 | 9/1966 | Fischer | 239/15 X |
| 3,599,038 | 8/1971 | Skidmore | 317/3 |
| 3,641,971 | 2/1972 | Walberg | 317/3 UX |
| 3,731,145 | 5/1973 | Senay | 317/3 |
| 3,746,253 | 7/1973 | Walberg | 239/15 |
| 3,795,839 | 3/1974 | Walberg | 239/15 X |
| 3,864,603 | 2/1975 | Kozinski et al. | 239/15 X |
| 3,872,370 | 3/1975 | Regnault | 317/3 |
| 3,896,994 | 7/1975 | Walberg | 239/15 |
| 3,929,286 | 12/1975 | Hastings et al. | 239/15 X |

*Primary Examiner*—Ronald Feldbaum
*Attorney, Agent, or Firm*—Thomas A. Stansbury

[57] ABSTRACT

A safety power supply system for electrostatic spray coating utilized high frequency (audio or radio frequencies) rectified DC pulses to provide the high voltage between an electrode on a spray gun and work to be coated. A high resistance direct electrical path to ground is provided for all parts of a coating system charged to high voltage during coating operations including highly conductive coating materials. For manual spray guns small electrodes or the atomizing edge of a coating material provides the electrode making it virtually impossible for an operator to come in contact with high voltage charged parts before a charge is substantially bled to ground.

7 Claims, 3 Drawing Figures

FIG. 2
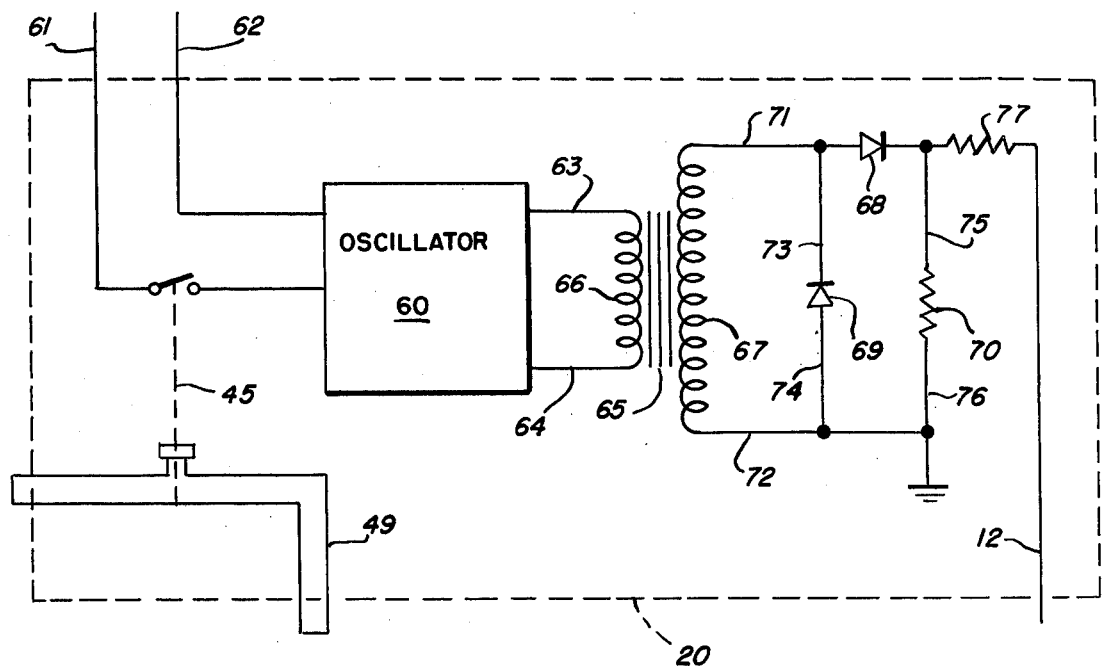
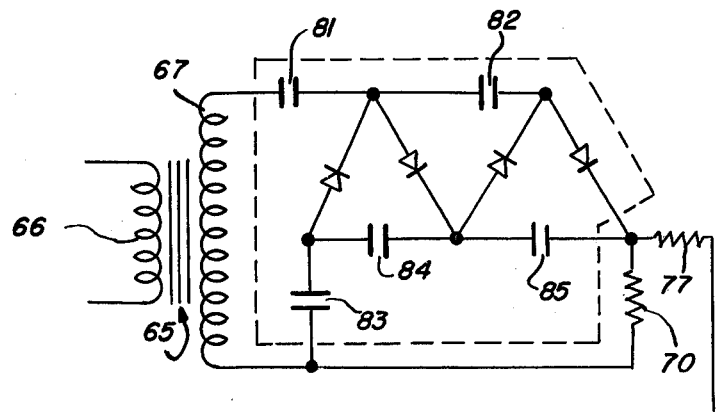
FIG. 3

FAST DISCHARGE ELECTROSTATIC COATING SYSTEM

BACKGROUND OF THE INVENTION

1. Field Of The Invention

The present invention relates to electrostatic spray coating systems and more particularly to electrostatic spray coating systems which have the ability to rapidly discharge their highly charged elements including highly conductive coating material if such material is being utilized for coating work.

2. Description Of The Prior Art

In the past, the high voltage for electrostatic spray coating equipment was obtained by rectifying either 110 volt or 220 volt commercial alternating current and stepping up the voltage by a high voltage transformer. These transformers were of the general power type wherein the transformer is submerged in an oil bath. It has been customary to rectify the output voltage of such transformers and to reduce ripple by connecting a sizeable amount of capacitance between the output terminals.

At the same time in the cathode ray tube art, power supplies were developed which utilized an audio or radio frequency oscillator to produce either sine wave or square wave pulses. However, such devices have not been utilized in the electrostatic spray coating field.

SUMMARY OF THE INVENTION

I have discovered that by utilizing an audio or radio frequency oscillator of the type used in the cathode ray tube art, stepping up the alternating sine or square wave current to at least 60,000 volts, then rectifying these high voltage pulses to provide a direct current and providing only resistance elements between the output terminals of the rectifier circuit (thereby eliminating any added capacitance), it is possible to provide an electrostatic system high voltage power supply which discharges relatively quickly to ground whenever the power supply is turned off. This eliminates the necessity for adding resistance in the spray gun to produce safety in manual or hand held spray gun equipment.

It is therefore, an object of the present invention to provide a new and improved electrostatic spray coating system for spraying both resistive and highly conductive coating materials.

A further object is to provide a high voltage power supply for an electrostatic spray coating system wherein the portions thereof charged to high voltage discharge to ground quickly through a resistance.

An additional object is to provide a high voltage power supply for an electrostatic spray coating system which does not require the employment of condensers in its output which add to the total capacitance of the spray coating system.

DESCRIPTION OF THE DRAWINGS

Further objects and advantages will become apparent from the following detailed description taken in connection with the accompanying drawings, in which:

FIG. 2 is an electrical schematic drawing of a portion of the preferred embodiment illustrated in FIG. 1 and, FIG. 3 is an electrical schematic drawing of a modified portion of the preferred embodiment illustrated in FIGS. 1 and 2.

DESCRIPTION OF THE PREFERRED EMBODIMENT

Figure 1:
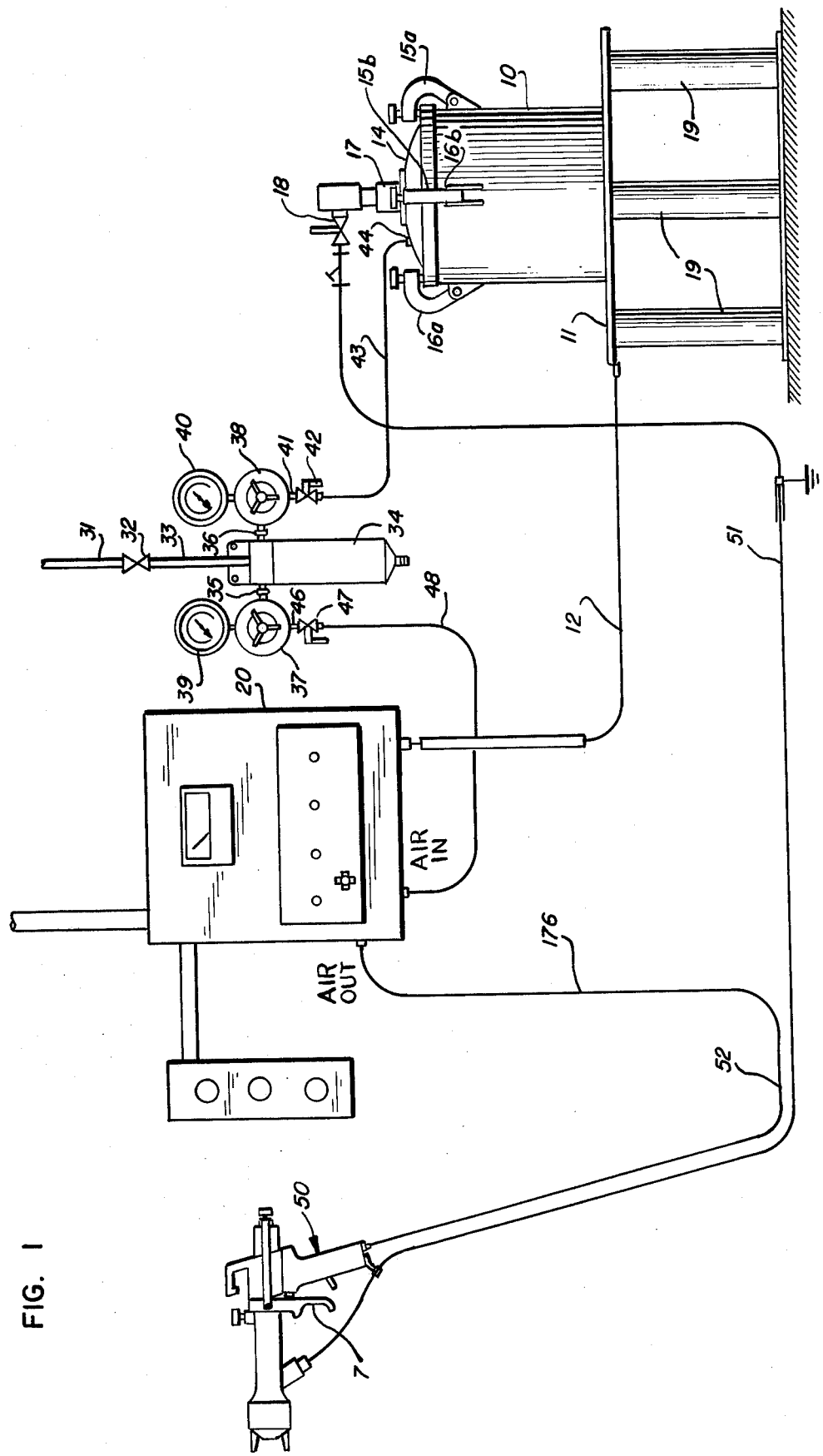
FIG. 1 is a schematic drawing incorporating a preferred embodiment of the invention.

While this invention is susceptible of embodiment in many different forms, there will be described herein in detail, embodiments of the invention with the understanding that the present disclosures are to be considered as exemplifications of the principles of the invention and are not intended to limit the invention to the embodiment illustrated. The scope of the invention will be pointed out in the appended claims.

Referring now to the drawings, the pressure tank 10 is mounted on a conductive plate 11 which is connected by a high voltage cable 12 to a power supply generally indicated at 20.

The pressure tank has a top 14 which is secured pressure tight by four clamps 15a, 15b, 16a and 16b. A pickup tube 17 extends to the bottom of tank 10 and has a valve 18 secured to its upper end. The pressure tank 10 is electrically isolated from ground by a set of legs 19 made of any suitable electrically non-conducting material.

High pressure air is obtained from any suitable source such as a manufacturers general air pressure source through a pipe 31, a valve 32 and a pipe 33 connected to an air filter 34. The air filter 34 is of any conventional design well known to those skilled in the art. It has two outputs 35 and 36 which are connected to air regulators 37 and 38 respectively. The output of air regulators 37 and 38 are connected to fluid pressure gauges 39 and 40 respectively. The output of regulator 38 is connected through tubing 41, shutoff valve 42, and a nylon fluid hose 43, to an aperture generally indicated at 44 in the top 14 of the pressure tank 10. Therefore pressure regulator 38 determines the internal pressure being applied to pressure tank 10.

Regulated air pressure from the output of pressure regulator 37 is applied to an air flow switch 45 through a conduit 46, a shutoff valve 47, a flexible nylon hose 48, and an internal pipe 49. A manually operated spray gun generally indicated at 50 is of the conical film atomizing type more fully disclosed in my U.S. Pat. No. 3,746,253 for a coating system, issued July 17, 1973. Conductive fluid such as water base paint is delivered through insulated cable hose 51 into a chamber at the head of the gun which may be of the insulated inner layer-conductive shield-nonconductive core type disclosed in the aforementioned U.S. Pat. No. 3,746,253. A nylon air hose 52 connects the air pipe 49 to the air passage in gun 50. A trigger 7 of the gun 50 operates an air valve which allows air to flow into the air passages of the gun as it is fully disclosed in the aforementioned U.S. Pat. No. 3,746,253. When the trigger is depressed the air pressure drops in hose 52 and pipe 49 actuating air flow switch 45 which may be of any conventional design well known to those skilled in the art. Actuation of switch 45 connects an oscillator 60 to either a 110 or 220 volt electrical power source as indicated by the leads 61 and 62. The oscillator 60 may be either a sine wave oscillator operating at audio or higher frequencies such as supersonic and radio frequencies or it may be a square wave oscillator operating at any of these frequencies. The square wave oscillator is preferred over the sine wave oscillator in that it provides a somewhat steadier DC voltage output after rectification as is hereinafter described.

The oscillator 60 is connected across the primary 66 of a step up transformer 65 by leads 63 and 64. The transformer 65 has a secondary 67. The oscillator can put out a voltage typical of the order of 24 to several hundred which appears across the primary 66. A set of diodes 68 and 69 are connected to produce a negative direct current voltage of at least 50,000 volts on lead 12 across a resistor 70 to ground. A typical value for resistor 70 is 500 megohms. A 150 megohm resistor is placed in series with lead 12 to eliminate or greatly reduce arcing that may occur at the charged electrode of gun 50. Diode 68 is connected between lead 12 and a lead 71 which is connected to one end of the secondary coil 67. The other end of the secondary coil 67 is connected to ground by lead 72. The diode 69 is connected by leads 73 and 74 across the secondary 67, and a resistor 70 is connected by leads 75 and 76 to the lead 12 and ground respectively.

Turning now to the operation, the container 10 is loaded with a highly conductive coating material such as water base paint. Air under pressure from a suitable source, usually the main compressed air system of the factory, flows through filter 34 to the regulators 37 and 38. Regulator 38 supplies air pressure to the tank 10. While this pressure can vary substantially, a typical pressure would be 15 to 20 psi. Pressure in the tank 10 forces coating material through the flexible fluid hose 51 to the gun 50. When the trigger 7 is depressed the fluid valve in the head of the gun opens to allow coating material to flow to the nozzle as is more fully described in the aforementioned U.S. Pat. No. 3,746,253. Atomizing air is provided through regulator 37, air hose 48 and air hose 52 to the atomizing air channel of spray gun 50. As soon as air starts to flow through air flow switch 45 it closes energizing oscillator 60.

As previously disclosed oscillator 60 provides either a sine wave or a square wave which is stepped up to a high voltage by the transformer 65 is rectified by diodes 68 and 69. This output is applied to the electrical lead 12 and is placed across the resistor 70. This places high voltage of at least 50,000 volts on lead 12 which is connected to the base plate 11 which thus raising tank 10 and its contents to this negative voltage of 50,000 volts relative to the ground. This voltage is conveyed by the coating material in the flexible fluid hose 51 to the head of the gun 50 charging all metal parts in the head of the gun to high voltage, as is more fully described in the aforestated U.S. Pat. No. 3,746,253. The atomizing edge of the material being sprayed through the gun may be the ionizing electrode or a separate electrode may be utilized in the gun as illustrated in FIGS. 3-5 of the aforestated U.S. Pat. No. 3,746,253.

When the trigger 7 is released it shuts off the air valve in gun 50 stopping the flow of air by air flow switch 45. Therefore switch 45 opens turning off the oscillator 60. The resistor 70 which is typically of the order of 500 hundred megohms discharges not only the voltage on lead 12 but the entire high voltage on the conductive fluid in the gun 50, the fluid hose 51 and the tank 10. The metal parts in the head of the gun 50 are also discharged. The time required to discharge the high voltage system depends on the capacitance of the high voltage system to ground and the size of the resistor 70. However, systems made in accordance with this invention will normally discharge to a comfortable and safe voltage. The voltage which is stepped up to the order of at least 50,000 or 60,000 volts and appears across the secondary 67, will discharge to a comfortable and safe voltage in ¼ to 3 seconds. With the head of the gun covered except for the nozzle and a needle point electrode if one is used, an operator will not normally make a movement which will place his hand or any other part of his body in contact with these parts within 3 seconds after he releases the trigger to stop the injection of coating material from the gun. This arrangement makes it unnecessary to provide any electrical resistance in the head of the gun as was formerly a common practice, particularly in manually operated guns. The only resistance in series with the output of the transformer 65 from which high negative voltage is supplied and the charged electrode at the spray gun is resistor 77 with a resistance in the order of 150 megohms. This resistance is mounted ahead of all the built-in capacitance of the paint supply, paint hose and gun.

Referring now to FIG. 3, a modified transformer secondary circuit for connection between primary 67 and the junction of resistors 70 and 77 is illustrated. The modification is shown within the dash lines 80. Outside the dash lines the unmodified elements which are illustrated in FIG. 2 bear the same identification numbers. The diodes 68 and 69 utilized for full wave rectification of the output alternating current voltage of the secondary 67 are replaced by a voltage lattice composed of relatively small value condensers 81-85 and interlinking lattice diodes 86-89. As will be recognized by those well skilled in the art, such a lattic composed of interlaced condensers and diodes will provide the full wave rectification provided by the circuit in FIG. 2 and will also provide a smoothing of the output voltage produced across resistor 70. Thus a more stable voltage is supplied to the spray gun 70. Since the capacitors 81-85 are relatively small there is little effect on the time constant to discharge the spray gun 50, the cable 51, the tank 14, and the conductive coating material in the system.

While a system has been disclosed and described which connects the high voltage power supply to highly conductive coating material in the supply tank, this system may be modified to connect high voltage lead 12 directly to either the metal or coating fluid in the head of the gun. This arrangement is preferred when relatively highly resistive coating materials are being sprayed although it may be used for either highly conductive coating material and resistive coating material. When the power supply is turned off by releasing the trigger of the gun, the metal in the head of the gun is quickly discharged as before and if conductive coating material is being sprayed, all of it will be discharged rapidly including the coating material in the fluid hose and the supply tank. Thus in the system illustrated in the FIGS. 1-3, no series resistance is required at the gun to provide safety for manually operated guns. Those skilled in the art will recognize that the gun 50 may be an automatic spray gun or series of guns which will supply safety to any workman entering the spray area when spraying is stopped. All such modification and variations are intended to be within the scope of the appended claims.

I claim:

1. A coating system comprising:
   a spray gun body for atomizing and ejecting coating material into the atmosphere having a forward end,
   means for generating an alternating series of high voltage pulses at not less than a supersonic frequency,
   means for rectifying said alternating series of direct current pulses into a series of single polarity high voltage pulses connected to said generating means and having an output of two terminals across which said series of pulses are provided as a high voltage direct current, an electrical resistance connecting said terminals, and means applying an electrostatic field to the atomized coating material being ejected from said gun forward end connected to one said terminal, the other said terminal being connected to work to be coated.

2. A coating system in accordance with claim 1, wherein generating means produced an alternating series of high voltage pulses at a radio frequency.

3. A coating system comprising:

a spray gun body for atomizing and ejecting coating material into the atmosphere having a forward end, an oscillator generating an alternating series of voltage pulses, means for transforming said alternating series of voltage pulses into a series of high voltage pulses connected to said oscillator, means for rectifying said alternating series of direct current pulses into a series of single polarity high voltage pulses connected to said transforming means and having an output of two terminals across which said series of pulses are provided as a high voltage direct current, an electrical resistance connecting said terminals, and means applying an electrostatic field to the atomized coating material being ejected from said gun forward end connected to one said terminal, the other said terminal being connected to work to be coated.

4. A coating system comprising a spray gun body having a forward end provided with a nozzle having an orifice through which coating material is ejected from the forward end of the body, wherein improvement comprises:

an annular conical orifice surrounding and spaced from said nozzle orifice through which air is ejected to converge at a point forward of said nozzle, a container for holding conductive coating, a fluid conduit connecting said container and said intake to transport conductive coating material from said container to said spray gun body passage, means for generating an alternating series of high voltage pulses, means for rectifying said alternating series of direct current pulses into a series of single polarity high voltage pulses connected to said generating means and having an output of two terminals across which said series of pulses are provided as a high voltage direct current, said terminals being connected between conductive coating material in said container and work to be coated, and an electrical resistance connecting said terminals.

5. An electrostatic deposition coating system comprising:

a spray gun body having a forward end provided with a passage therein having an intake for connection to a source of pressurized coating material and an outlet terminating in a means through which coating material is ejected from the forward end of the body, a container for holding conductive coating, a flexible electrical non-conducting fluid conduit connecting said container and said intake to transport conductive coating material from said container to said spray gun body passage, a flexible shield of electrical conducting material surrounding said fluid conduit and connected to work to be coated, means for generating an alternating series of high voltage pulses, means for rectifying said alternating series of direct current pulses into a series of single polarity high voltage pulses connected to said generating means and having an output of two terminals across which said series of pulses are provided as a high voltage direct current, said terminals being connected between conductive coating material in said container and work to be coated, and an electrical resistance connecting said terminals.

6. A coating system as specified in claim 1, wherein said atomized coating material being ejected from said gun forward end is connected through a resistance to the one said terminal.

7. A coating system as specified in claim 3, wherein said atomized coating material being ejected from said gun forward end is connected through a resistance to the one said terminal.

* * * * *